J. L. NIX.
EGG TURNER.
APPLICATION FILED JAN. 20, 1908.

905,742.

Patented Dec. 1, 1908.

UNITED STATES PATENT OFFICE.

JAMES L. NIX, OF HOMER CITY, PENNSYLVANIA.

EGG-TURNER.

No. 905,742.  Specification of Letters Patent.  Patented Dec. 1, 1908.

Application filed January 20, 1908. Serial No. 411,839.

*To all whom it may concern:*

Be it known that I, JAMES L. NIX, a citizen of the United States, and resident of Homer City, Pennsylvania, have invented certain new and useful Improvements in Egg-Turners, of which the following is a specification.

My invention relates to improvements in egg turners and has for its object to provide means for turning eggs during the process of artificial incubation.

Figure 1:
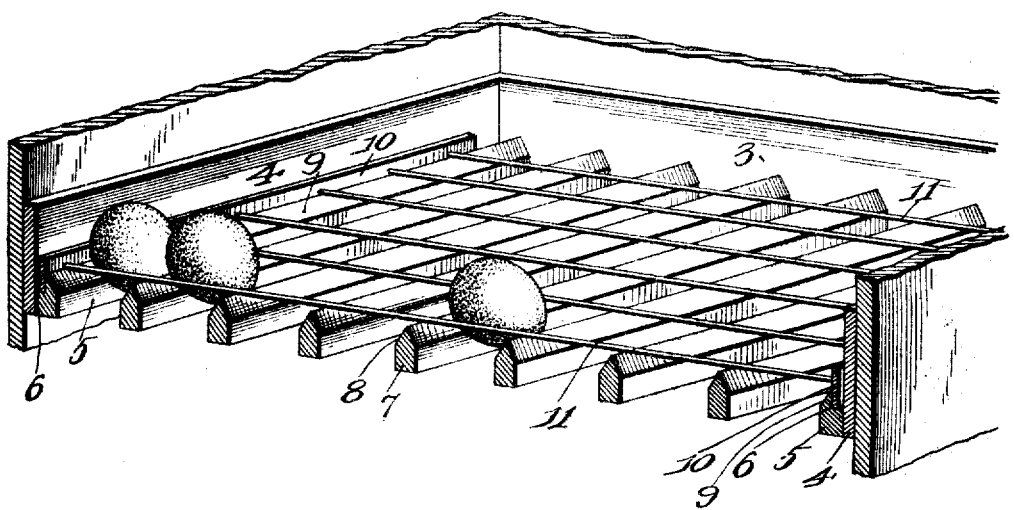
Figure 2:
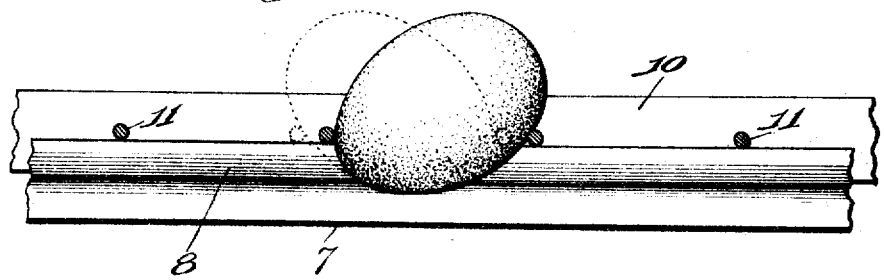

In the drawings: Figure 1, is a perspective view of a device embodying my invention. Fig. 2, is an enlarged detail view of the same, showing the turning rods in section.

As shown in the drawings, I employ in my invention, a bottomless egg drawer composed of the back wall 3, and side walls 4. As illustrated in Fig. 1, no front wall is required, but the drawer may be provided with a front wall if desired. To each of the side walls 4, and at their bottoms, I provide the rabbeted bar 5, which is provided with the groove 6 throughout its entire length, as shown. Intermediate the bars 5, I provide parallel bars 7 of the form shown in Fig. 1, said bars being rectangular in section at their bottoms and having beveled edges 8 at their tops; the said edges having an angle of approximately 60 degrees. The bars 5 are likewise beveled as indicated by the numeral 9.

The sliding members 10 are mounted in the grooves 6, and connected together by means of the rods 11, said rods 11 being parallel with each other, and when in position, being mounted at right angles to the bars 7. By means of this arrangement of parts, I have provided a number of rectangular openings, each of which is adapted to receive an egg when the egg is stood on end; that is to say, each space is of a sufficient size to receive an egg and retain the same approximately in a vertical position as illustrated in both figures of the drawings. The eggs thus placed in position are turned during the process of incubation by the movement of the rods 11, the resulting movement of the egg being indicated in Fig. 2.

By means of the device described I prevent creeping of the eggs which is unavoidable when the egg is laid upon its side upon the bottom of an egg tray during the process of incubation, and is attempted to be turned in that position.

Having fully described my invention what I claim is:

1. In an egg turner, the combination of a bottomless drawer composed of parallel bars mounted in a frame, and a second frame composed of side members and transverse rods carried by said side members, the last named frame being slidably mounted within the first named frame, substantially as described.

2. In an egg turner, the combination of a drawer comprising a frame and egg-supporting parallel bars mounted in said frame; a second frame slidably mounted in the first named frame and comprising side members and transverse rods carried by said side members; the apertures formed by the parallel bars in the first named frame and the transverse rods in the second named frame being of such size as to receive and retain the eggs in a substantially vertical position, substantially as described.

In testimony whereof, I have signed my name to this specification, in presence of two subscribing witnesses.

JAMES L. NIX.

Witnesses:
ALFRED A. EICKS,
WALTER C. STEIN.